United States Patent
Hsu et al.

(10) Patent No.: US 10,838,521 B2
(45) Date of Patent: Nov. 17, 2020

(54) TOUCH STYLUS

(71) Applicant: Chicony Electronics Co., Ltd., New Taipei (TW)

(72) Inventors: Cheng-Chi Hsu, New Taipei (TW); Ji-Hung Lu, New Taipei (TW)

(73) Assignee: Chicony Electronics Co., Ltd., New Taipei (TW)

( * ) Notice: Subject to any disclaimer, the term of this patent is extended or adjusted under 35 U.S.C. 154(b) by 0 days.

(21) Appl. No.: 16/455,723

(22) Filed: Jun. 27, 2019

(65) Prior Publication Data

US 2020/0272256 A1    Aug. 27, 2020

(30) Foreign Application Priority Data

Feb. 27, 2019  (TW) .............................. 108106892 A (51) Int. Cl.
*G06F 3/0354* (2013.01)
*G06F 3/044* (2006.01)

(52) U.S. Cl.
CPC ........ *G06F 3/03545* (2013.01); *G06F 3/0442* (2019.05)

(58) Field of Classification Search
CPC ... G06F 3/03545; G06F 3/0441; G06F 3/0442
See application file for complete search history.

(56) References Cited

U.S. PATENT DOCUMENTS

| | | | | |
|---|---|---|---|---|
| 4,498,043 A | * | 2/1985 | Heathcote | G01B 7/012 200/600 |
| 5,438,275 A | * | 8/1995 | Fado | G06F 3/03545 324/662 |
| 2015/0324018 A1 | * | 11/2015 | Hinson | G06F 3/0416 345/179 |
| 2016/0084340 A1 | * | 3/2016 | Kadowaki | F16F 13/1409 267/141.7 |
| 2016/0195942 A1 | * | 7/2016 | Chen | G06F 3/03545 345/179 |
| 2018/0217684 A1 | * | 8/2018 | Mishalov | G06F 3/041 |
| 2020/0050298 A1 | * | 2/2020 | Tanaka | G06F 3/03545 |

* cited by examiner

*Primary Examiner* — Dong Hui Liang
(74) *Attorney, Agent, or Firm* — CKC & Partners Co., LLC (57) ABSTRACT

A touch stylus includes a stopper, a rod, a pressing element, a force sensor, and an elastic element. The rod and the pressing element are moveable relative to the stopper. The pressing element includes a first pressing portion, a second pressing portion, and at least one support arm. The first pressing portion is located between the rod and the stopper. The stopper is located between the first and the second pressing portions. The support arm extends from the first pressing portion to the second pressing portion. The force sensor is disposed between the stopper and the second pressing portion. The elastic element is connected to the pressing element. When the pressing element is located at a first position, the pressing element abuts against the force sensor. When the pressing element is located at a second position, the pressing element and the force sensor are separated from each other.

16 Claims, 8 Drawing Sheets

TOUCH STYLUS

RELATED APPLICATIONS

This application claims priority to Taiwanese Application Serial Number 108106892, filed Feb. 27, 2019, which is herein incorporated by reference.

BACKGROUND

Technical Field

The present disclosure relates to a touch stylus.

Description of Related Art

Regarding an operation method of a portable electronic device, because a touch display device allows a user to perform an intuitive touch control operation, it is widely used in various portable electronic devices. Accordingly, in order to prevent too many imprints on a touch panel when the touch panel is touched by a finger, a touch stylus is therefore developed.

Taking a capacitive touch display device as an example, when a touch stylus touches a position on a touch panel, a capacitance of a sensing electrode on the position may vary such that the touch display device can obtain the position touched by the touch stylus, so as to execute a corresponding command. Taking a graphic design program as an example, when a touch stylus touches a touch panel and keeps moving on the touch panel, a control unit of the touch display device can request a display device to display a color along the path of the touch stylus on the display device. Therefore, a user may have an experience similar to drawing on a paper.

SUMMARY

An aspect of the present disclosure is to provide a touch stylus including a stopper, a rod, a pressing element, a force sensor, and an elastic element. The rod is moveable relative to the stopper. The pressing element is moveable relative to the stopper and includes a first pressing portion, a second pressing portion, and at least one support arm. The first pressing portion is located between the rod and the stopper. The stopper is located between the first pressing portion and the second pressing portion. The support arm extends from the first pressing portion to the second pressing portion. The force sensor is disposed between the stopper and the second pressing portion. The elastic element is connected to the pressing element. When the pressing element is located at a first position, the pressing element abuts against the force sensor. When the pressing element is located at a second position, the pressing element and the force sensor are separated from each other.

In some embodiments, when the pressing element is located at the first position, the second pressing portion and the stopper are spaced apart by a first distance. When the pressing element is located at the second position, the second pressing portion and the stopper are spaced apart by a second distance, in which the first distance is less than the second distance.

In some embodiments, the elastic element is disposed between the first pressing portion and the stopper.

In some embodiments, the elastic element has a first end and a second end which are opposite each other. The first end is fixed on the stopper, and the second end abuts against the first pressing portion.

In some embodiments, the force sensor and the elastic element are separated from each other by the stopper.

In some embodiments, the touch stylus further includes a case. The stopper and the pressing element are disposed on the case. The case has a slide slot. A portion of the support arm is located in the slide slot, and an extending length of the portion of the support arm is less than an extending length of the slide slot.

In some embodiments, the touch stylus further includes a fixed element. The second pressing portion is located between the force sensor and the fixed element. The elastic element is disposed between the second pressing portion and the fixed element, and the second pressing portion is moveable relative to the fixed element.

In some embodiments, the elastic element has a first end and a second end which are opposite each other. The first end is fixed on the stopper, and the second end abuts against the second pressing portion.

In some embodiments, the force sensor and the elastic element are separated from each other by the second pressing portion.

In some embodiments, the touch stylus further includes a position limiter which is elastic and is disposed between the first pressing portion and the stopper. When the pressing element is located at the first position, the position limiter and the first pressing portion are separated from each other.

In some embodiments the force sensor is fixed on the stopper and has a sensing surface. When the pressing element is located at the first position, the second pressing presses the sensing surface.

In some embodiments, the at least one support arm is a pair of support arms. The first pressing portion and the second pressing portion are connected to each other by the pair of support arms, and the first pressing portion, the second pressing portion, and the pair of support arms collectively forms a ring-shaped structure.

In some embodiments, the touch stylus further includes a case and a pusher. The stopper and the pressing element are disposed on the case, and the rod extends from inside the case to outside the case. The pusher is disposed between the rod and the pressing element. The case has an abutting surface facing the pusher, and the pusher abuts against the abutting surface when the pressing element is located at the first position.

An aspect of the present disclosure is to provide a touch stylus including a rod, a force sensor, and a pressing element. The force sensor has a sensing surface which faces away from the rod. The pressing element includes a first pressing portion, a second pressing portion, and at least one support arm which connects the first pressing portion to the second pressing portion. The first pressing portion is located between the rod and the force sensor. The force sensor is located between the first pressing portion and the second pressing portion. The sensing surface faces toward the second pressing portion.

In some embodiments, the touch stylus further includes a stopper and an elastic element. The stopper is disposed between the first pressing portion and the force sensor. The elastic element is disposed between the first pressing portion and the stopper.

In some embodiments, the touch stylus further includes a stopper, a fixed element, and an elastic element. The stopper is disposed between the first pressing portion and the force sensor. The second pressing portion is located between the force sensor and the fixed element. The elastic element is disposed between the second pressing portion and the fixed element.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

It will be understood that, although the terms "first," "second," etc., may be used herein to describe various elements, components, areas, or layers, these elements should not be limited by these terms. These terms are used to distinguish one element, component, area, or layer from another. For example, a first element could be termed a second element, and, similarly, a second element could be termed a first element, without departing from the scope of the embodiments. As used herein, the term "and/or" includes any and all combinations of one or more of the associated listed items. Furthermore, as used herein, the term "connect" includes "directly connect" and "indirectly connect". For example, when a first component is directly connected to a second component, the first component is in physical contact with the second component. For example, when a first component is indirectly connected to a second component, there is a third component located between the first component and the second component, and the third component is in physical contact with the first component and the second component.

Figure 1A:
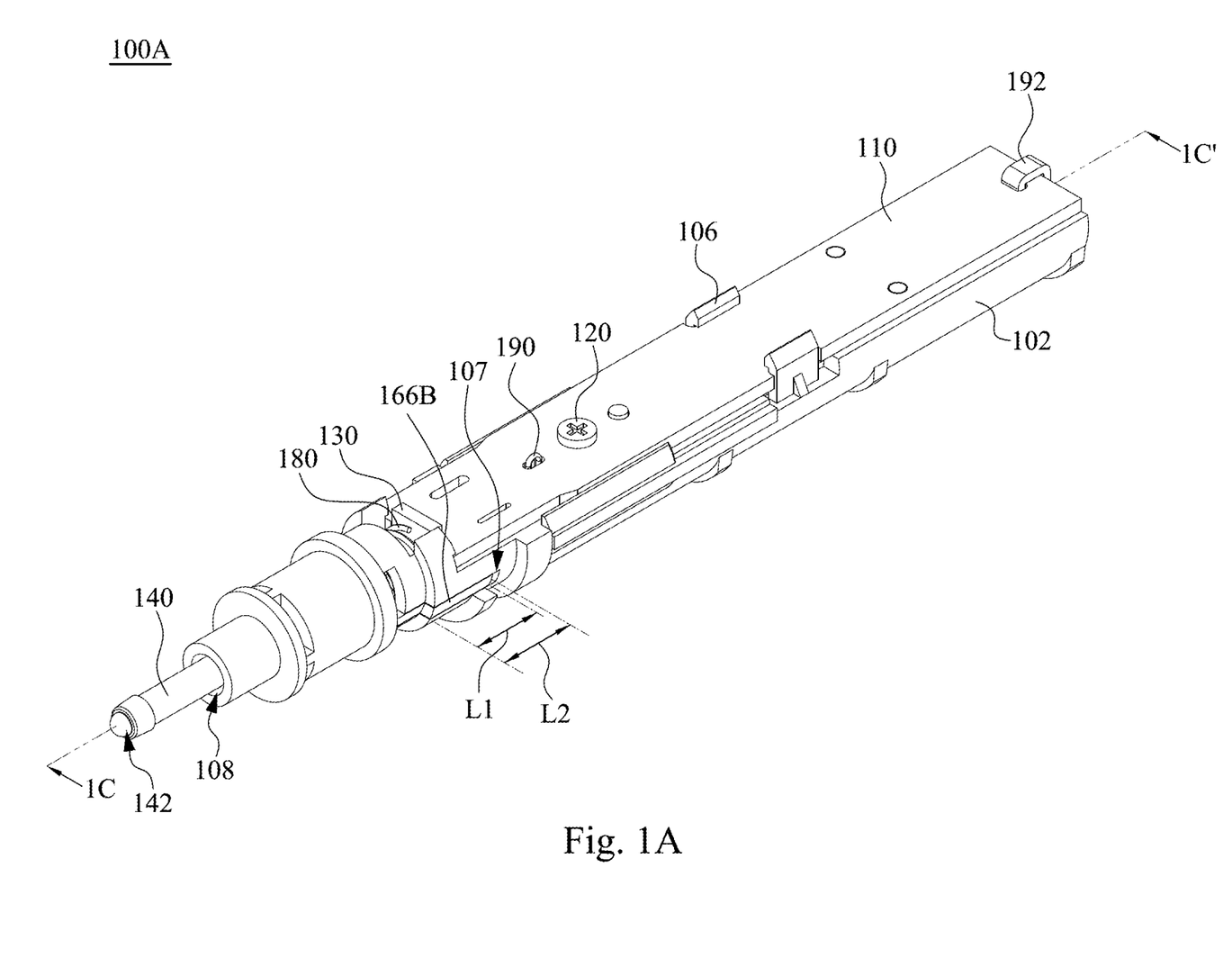
FIG. 1A is a schematic perspective view of a touch stylus according to a first embodiment of the present disclosure.
Figure 1B:
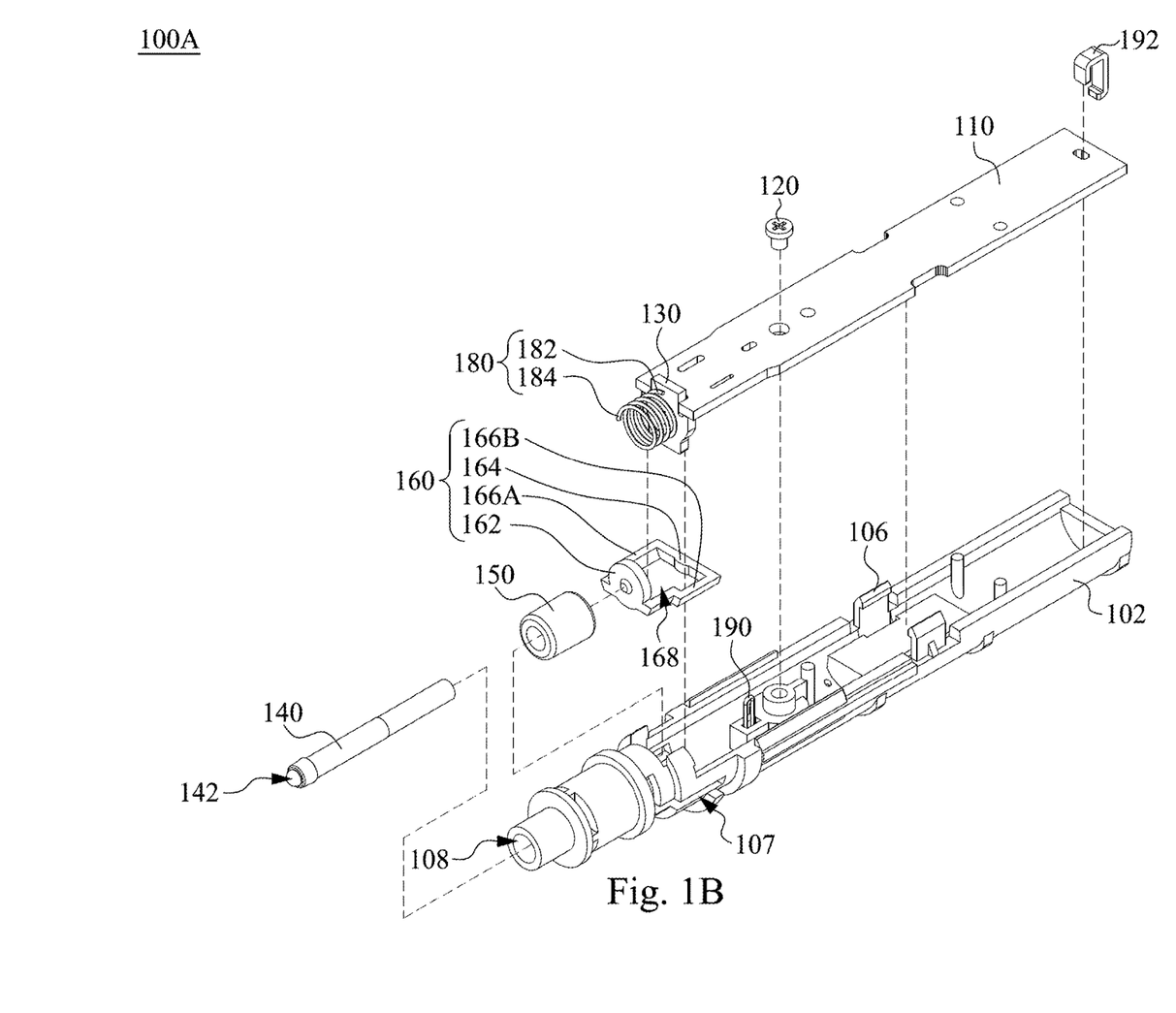
FIG. 1B is an exploded view of the touch stylus shown in FIG. 1A.
Figure 1C:
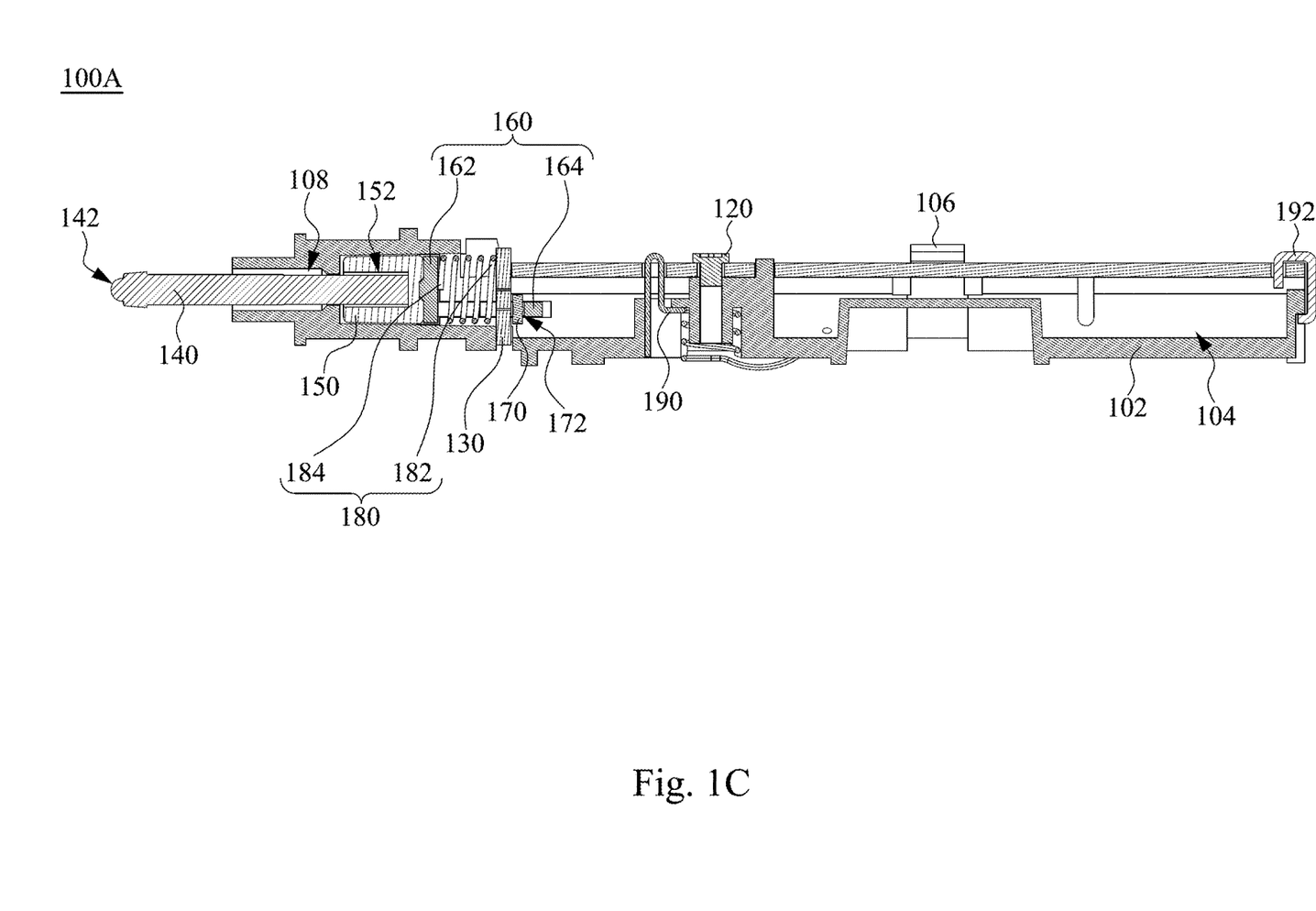
FIG. 1C is a cross-sectional view of the touch stylus taken along line 1C-1C' of FIG. 1A.

An aspect of the present disclosure is to provide a touch stylus including a force sensor. When a user uses the touch stylus to perform a touching operation, the force sensor is configured to sense a force applied by the user. The touch stylus further includes a pressing element and an elastic element, which can provide a protection mechanism for the force sensor, thereby preventing the touch stylus from being damaged by impact of an external force. Reference is made to FIG. 1A, FIG. 1B, and FIG. 1C. FIG. 1A is a schematic perspective view of a touch stylus 100A according to a first embodiment of the present disclosure. FIG. 1B is an exploded view of the touch stylus 100A shown in FIG. 1A. FIG. 1C is a cross-sectional view of the touch stylus 100A taken along line 1C-1C' of FIG. 1A.

The touch stylus 100A includes a case 102, a board 110, a securing element 120, a stopper 130, a rod 140, a pusher 150, a pressing element 160, a force sensor 170, an elastic element 180, a first conductive element 190, and a second conductive element 192. The case 102 and the board 110 can be assembled together, and an accommodation space 104 is formed between the case 102 and the board 110 assembled together. Specifically, the case 102 may have a locking portion 106, and the board 110 can be fixed on the case 102 through the locking portion 106. The securing element 120 passes through the board 110 and then is secured to the case 102. The board 110 may be a circuit board. For example, the board 110 may include an active component, a passive component, a circuit layer, other electronic components, or combinations thereof. The first conductive element 190 can be fixed on the case 102 and extend to be connected to the board 110. The second conductive element 192 can be fixed on the board 110 and enable the board 110 and the case 102 to be fixed together. In some embodiments, the accommodation space 104 is configured to accommodate a battery (not illustrated). The battery may be electrically connected to the first conductive element 190 and the second conductive element 192, so as to supply electrical power to the electronic components of the board 110.

The rod 140 and the pusher 150 can be connected to each other and are disposed in the case 102. The rod 140 and the pusher 150 are moveable relative to the case 102. A bottom of the rod 140 may be located in a recess 152 of the pusher 150, and the rod 140 may extend from inside the case 102 to outside the case 102. For example, the case 102 has an opening end 108, and the rod 140 may extend from within the recess 152 of the pusher 150 and then pass through the opening end 108 of the case 102, so as to extend from inside the case 102 to outside the case 102. In some embodiments, the rod 140 and the pusher 150 can be connected and fixed to each other by an interference-fit. For example, the bottom of the rod 140 is clamped by the pusher 150. The rod 140 may have an end surface 142 facing away from the pusher 150. When a user operates a target object (such as a touch device that is not illustrated in the drawings) through the touch stylus 100A, the end surface 142 of the rod 140 is configured to contact the touch device, so as to perform a touching operation with respect to the touch device.

The stopper 130 is in a sheet shape and is disposed on the case 102. For example, the stopper 130 may be connected to the board 110, and the stopper 130 is fixed to an end of the board 110 and extends toward the case 102. Furthermore, the pusher 150 may be located between the rod 140 and the stopper 130, and the rod 140 and the pusher 150 are moveable relative to the stopper 130.

The pressing element 160 is disposed on the case 102, and the pressing element 160 is moveable relative to the case 102. The pressing element 160 includes a first pressing portion 162, a second pressing portion 164, and a pair of support arms 166A and 166B which extend from the first pressing portion 162 to the second pressing portion 164. That is, the first pressing portion 162 and the second pressing portion 164 can be connected to each other by the support arms 166A and 166B, so as to collectively form a ring-shaped structure. The ring-shaped pressing element 160 has an opening 168 that is collectively formed by the first pressing portion 162, the second pressing portion 164, and the support arms 166A and 166B, and the stopper 130 may pass through the opening 168 during the assembly stage. Specifically, the first pressing portion 162 is located between the rod 140 and the stopper 130, and the stopper 130 is located between the first pressing portion 162 and the second pressing portion 164. In addition, the stopper 130 is located between the support arms 166A and 166B.

The force sensor 170 is disposed between the stopper 130 and the second pressing portion 164 of the pressing element 160, in which the force sensor 170 may be fixed on the stopper 130 and electrically connected to the electronic component of the board 110. The force sensor 170 may be a capacitive force sensor or a resistance force sensor, which can produce an electrical change due to pressure. That is, the force sensor 170 is configured to measure pressure applied thereto according to the degree of electrical change. The force sensor 170 may have a sensing surface 172 facing toward the second pressing portion 164 of the pressing element 160. In some embodiments, a bump is formed on the sensing surface 172 of the force sensor 170, and the force sensor 170 may output an electrical change when the bump is pressed.

The elastic element 180 is disposed between the first pressing portion 162 of the pressing element 160 and the stopper 130 and is connected to the first pressing portion 162 of the pressing element 160. The elastic element 180 can be connected to the first pressing portion 162 of the pressing element 160 by directly connecting or indirectly connecting. In the present disclosure, elasticity of the elastic element 180 is greater than elasticity of the pressing element 160. For example, the elastic element 180 may be a spring and have a first end 182 and a second end 184 which are opposite each other. The first end 182 of the elastic element 180 is fixed on the stopper 130, and the second end 184 of the elastic element 180 abuts against the first pressing portion 162 of the pressing element 160. In the present embodiment, the first end 182 and the second end 184 of the elastic element 180 is in contact with the stopper 130 and the first pressing portion 162 respectively, so as to directly connect the stopper 130 and the first pressing portion 162. In other embodiments, the first end 182 and the second end 184 of the elastic element 180 is indirectly connected to the stopper 130 and the first pressing portion 162 respectively through an auxiliary component, such as a pad. The elastic element 180 may apply a restoring force to the first pressing portion 162 of the pressing element 160 when being pressed, such that the second end 184 of the elastic element 180 may abut against the first pressing portion 162 of the pressing element 160.

In addition, the elastic element 180 and the force sensor 170 may be respectively located at two opposite sides of the stopper 130 (e.g. at front and back sides of the stopper 130) and separated from each other by the stopper 130. By this configuration, it can prevent the elastic element 180 from influencing the force sensor 170 during the assembly stage of the touch stylus 100A. For example, it can prevent the elastic element 180 from pressing the force sensor 170 due to an unexpected alignment, so as to simplify the assembly stage of the touch stylus 100A.

The following descriptions are provided to explain how the force sensor 170 can sense a force applied by the touch stylus 100A used by a user.

Figure 2A:
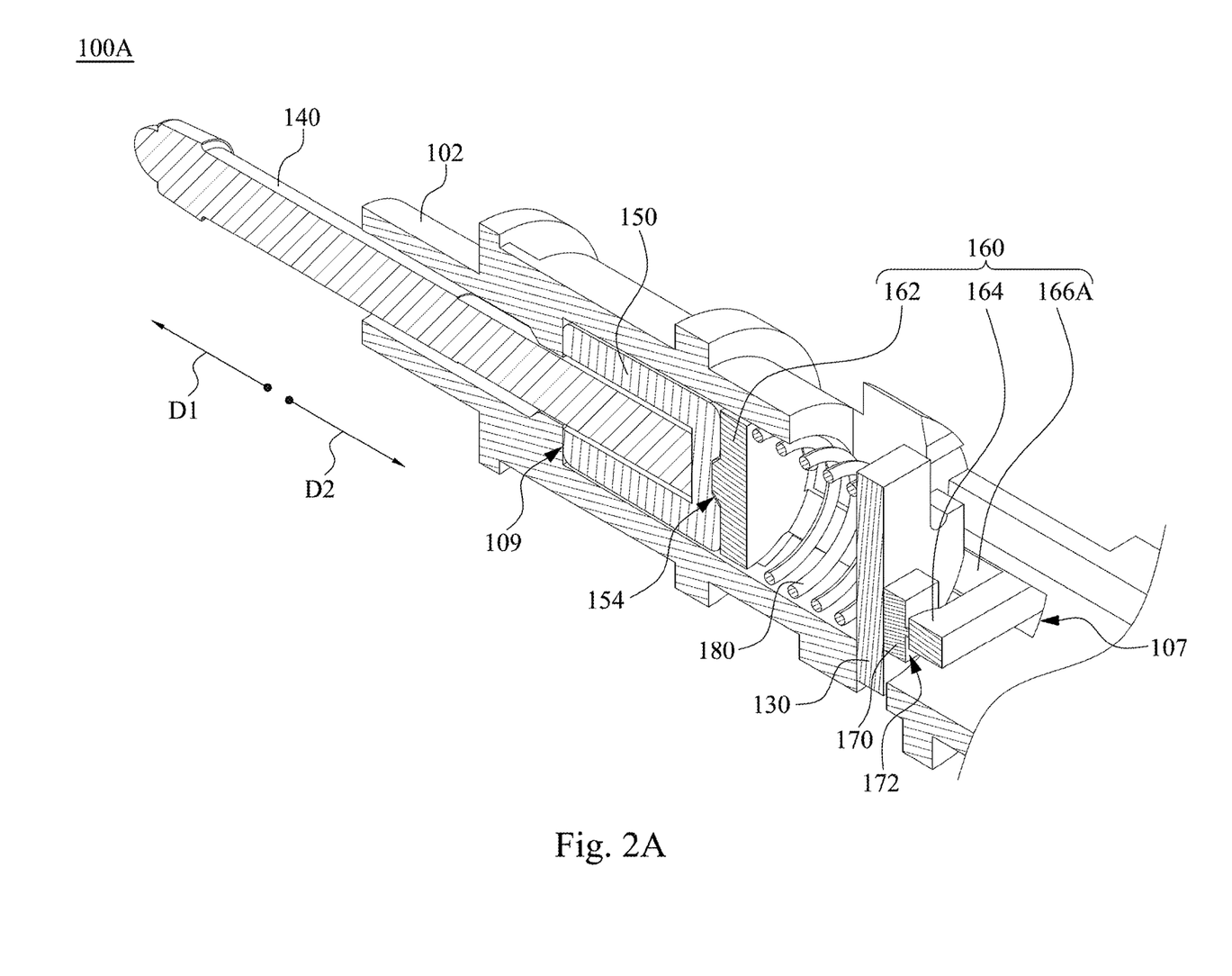
FIG. 2A is a perspective-sectional view of the touch stylus shown in FIG. 1C, in which a pressing element is located at a first position.
Figure 2B:
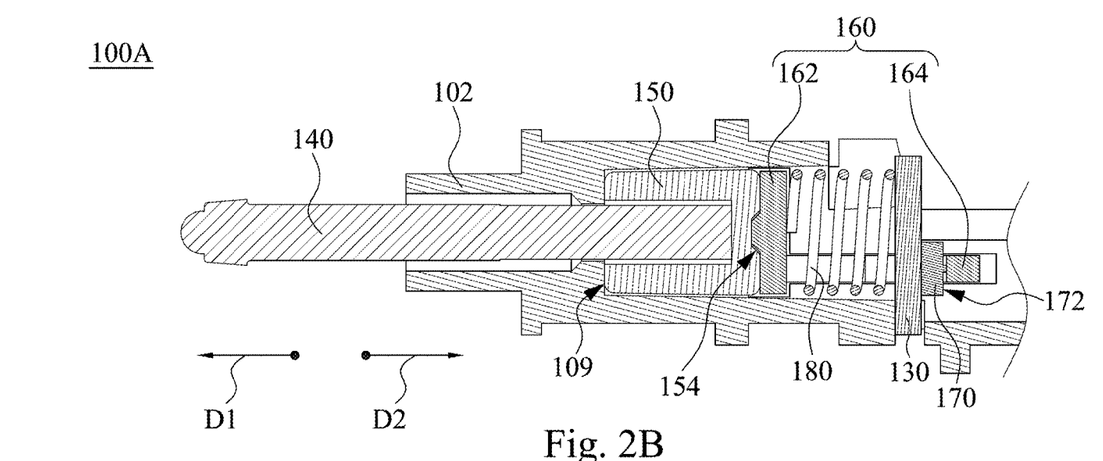
FIG. 2B is a side view of the touch stylus shown in FIG. 2A.
Figure 2C:
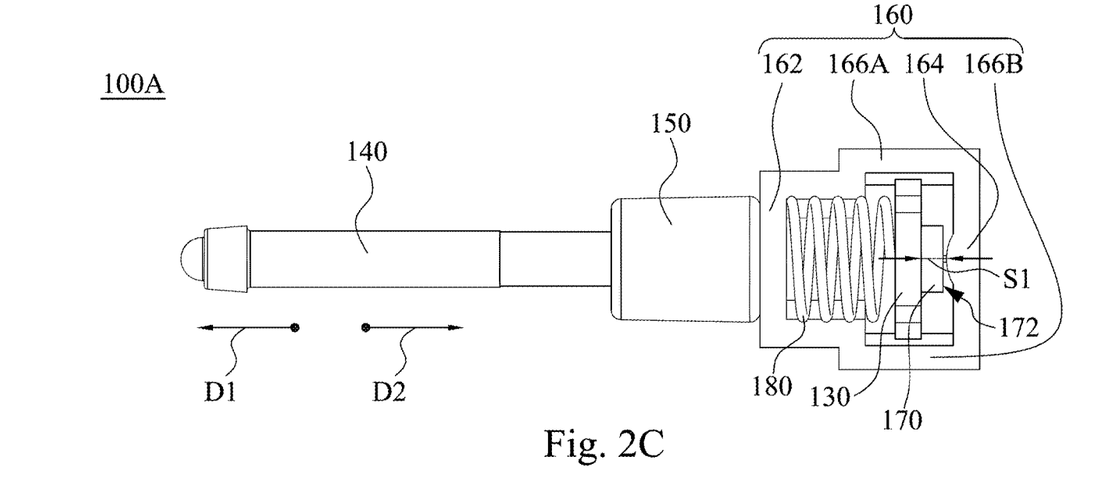
FIG. 2C is a top view of a stopper, a rod, a pusher, the pressing element, a force sensor, and an elastic element shown in FIG. 2A.

Reference is made to FIG. 2A, FIG. 2B, and FIG. 2C. FIG. 2A is a perspective-sectional view of the touch stylus 100A shown in FIG. 1C, in which the pressing element 160 is located at a first position. FIG. 2B is a side view of the touch stylus 100A shown in FIG. 2A. FIG. 2C is a top view of the stopper 130, the rod 140, the pusher 150, the pressing element 160, the force sensor 170, and the elastic element 180 shown in FIG. 2A.

For convenience of description, a first direction D1 and a second direction D2 are illustrated in FIG. 2A, FIG. 2B, and FIG. 2C. The first direction D1 is a direction along which the stopper 130 directs to the first pressing portion 162 of the pressing element 160. The second direction D2 is a direction along which the stopper 130 directs to the second pressing portion 164 of the pressing element 160. That is, the first direction D1 and the second direction D2 are opposite each other.

In the present disclosure, the term "first position" may mean the position of the pressing element 160 with respect to the case 102 or the stopper 130 when the touch stylus 100A does not press a touch device. In other words, the term "first position" may mean the position of the pressing element 160 with respect to the case 102 or the stopper 130 when the touch stylus 100A is in a rest state (i.e. is not in operation).

When the pressing element 160 is located at the first position, the second pressing portion 164 of the pressing element 160 is in contact with the sensing surface 172 of the force sensor 170. For example, the second pressing portion 164 of the pressing element 160 is in contact with the bump of the sensing surface 172 of the force sensor 170. Specifically, with a force applied to the first pressing portion 162 of the pressing element 160 by the elastic element 180, the pressing element 160 can be pushed along the first direction D1, such that the second pressing portion 164 of the pressing element 160 can press the sensing surface 172 of the force sensor 170. In some embodiments, the second pressing portion 164 of the pressing element 160 may protrude toward the force sensor 170, so as to form a protruding surface. Such a protruding surface may enable the pressure which is applied to the bump of the sensing surface 172 by the second pressing portion 164 of the pressing element 160 to be more uniform.

Furthermore, the case 102 may have an abutting surface 109 facing toward the pusher 150, and the pusher 150 is located between the abutting surface 109 and the first pressing portion 162 of the pressing element 160. Since the elastic element 180 can apply a force along the first direction D1 to the first pressing portion 162 of the pressing element 160, the first pressing portion 162 of the pressing element 160 can push the pusher 150 along the first direction D1. The pusher 150 which is pushed by the first pressing portion 162 of the pressing element 160 can be provided with a position limit mechanism by the abutting surface 109 of the case 102, thereby keeping the elastic element 180 abutting against the first pressing portion 162 of the pressing element 160. In some embodiments, the first pressing portion 162 of the pressing element 160 may protrude toward the pusher 150, and a surface of the pusher 150 that faces toward the first pressing portion 162 of the pressing element 160 forms a recess portion 154. The protruding portion of the first pressing portion 162 can abut against inside the recess portion 154 of the pusher 150, thereby enabling the force applied to the pusher 150 by the first pressing portion 162 to become more uniform.

When a user uses the touch stylus 100A to contact the touch device for performing a touching operation, a force exerted by the touch stylus 100A is applied to the rod 140 and the pusher 150, such that the rod 140 and the pusher 150 correspondingly move toward and approach to the stopper 130. Thereafter, the pusher 150 which is located closer to the stopper 130 than the rod 140 can push the pressing element 160 and thus the pressing element 160 moves, such that the second pressing portion 164 of the pressing element 160 can move along the second direction D2. In other words, the second pressing portion 164 of the pressing element 160 can be moved away from the force sensor 170.

In this regard, a moving distance of the second pressing portion 164 along the second direction D2 is positively correlated with the force applied by the user for performing the touching operation (e.g. the force caused by clicking the touch stylus 100A). That is, when the force applied by the user increases, the moving distance of the second pressing portion 164 along the second direction D2 increases as well. As such, the pressure applied to the force sensor 170 by the second pressing portion 164 may correspondingly decrease, so as to make the electrical property of the force sensor 170 change (e.g. the change in capacitance or resistance). Therefore, by such a mechanism, according to the electrical change of the force sensor 170, the force sensor 170 can calculate the force applied by the touch stylus 100A used by the user for performing the touch operation.

Moreover, the electrical change of the force sensor 170 may change, such as a change in capacitance or resistance, in a negative correlation with the force applied for performing the touching operation.

Figure 3A:
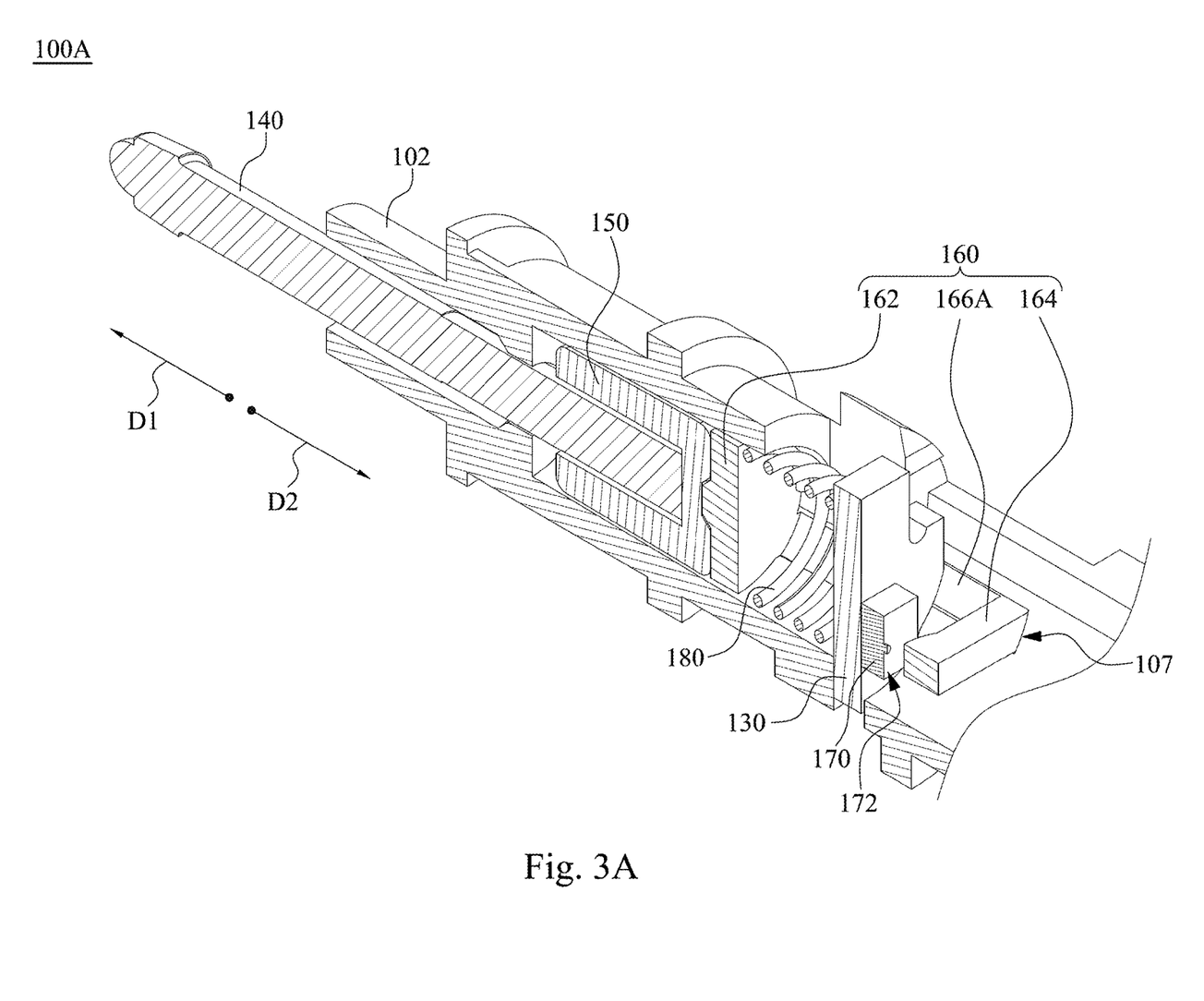
FIG. 3A is a perspective-sectional view of the touch stylus shown in FIG. 1C, in which the pressing element is located at a second position.
Figure 3B:
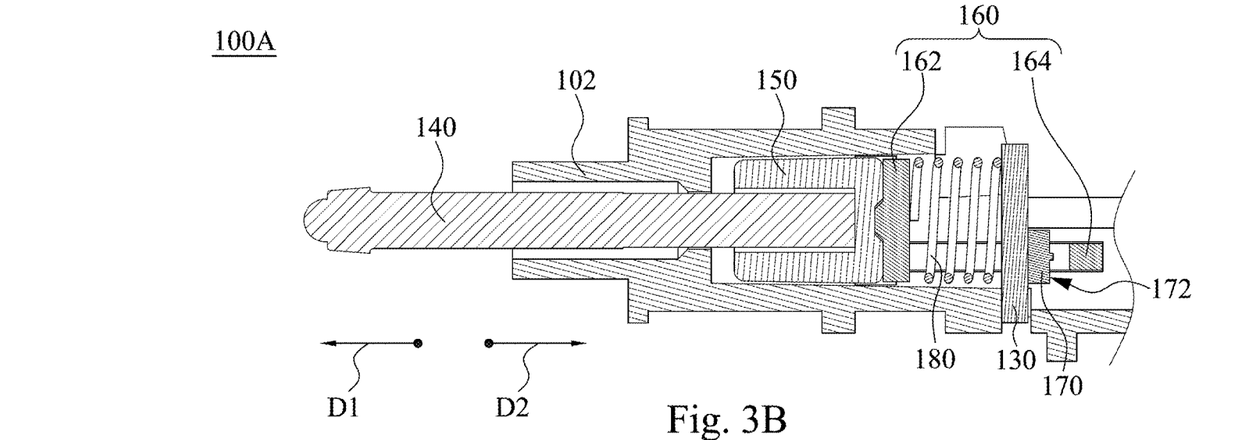
FIG. 3B is a side view of the touch stylus shown in FIG. 3A.
Figure 3C:
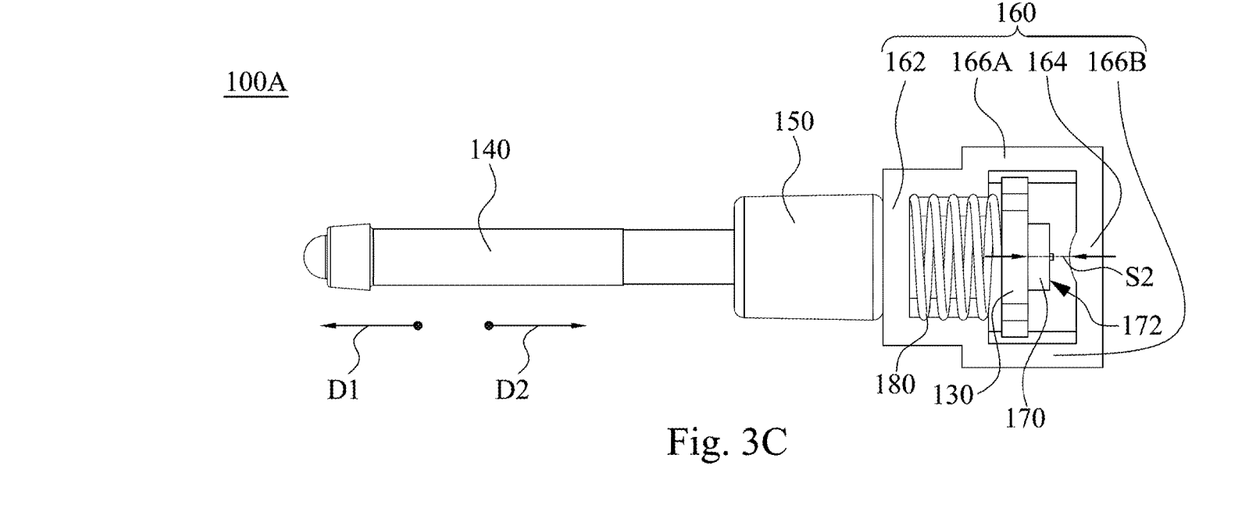
FIG. 3C is a top view of the stopper, the rod, the pusher, the pressing element, the force sensor, and the elastic element shown in FIG. 3A.

On the other hand, under a situation that the touch stylus 100A senses the force by the above mechanism, the touch stylus 100A can be prevented from being damaged by an excessive force applied to the rod 140. Reference is made to FIG. 3A, FIG. 3B, and FIG. 3C. FIG. 3A is a perspective-sectional view of the touch stylus 100A shown in FIG. 1C, in which the pressing element 160 is located at a second position. FIG. 3B is a side view of the touch stylus 100A shown in FIG. 3A. FIG. 3C is a top view of the stopper 130, the rod 140, the pusher 150, the pressing element 160, the force sensor 170, and the elastic element 180 shown in FIG. 3A. For convenience of description, the first direction D1 and the second direction D2 are illustrated in FIG. 3A, FIG. 3B, and FIG. 3C.

In the present disclosure, the term "second position" is used to describe the position of the pressing element 160 with respect to the case 102 or the stopper 130, and the second position is different than the first position.

When an excessive force is applied to the rod 140, the excessive force may be transmitted to the internal structure of the touch stylus 100A via the rod 140, in which the excessive force may be caused by an unexpected dropping of the touch stylus 100A, overly pressing by the user, or other situations. In this regard, since the force applied to the rod 140 along the second direction D2 is negatively correlated with the pressure applied to the force sensor 170 by the second pressing portion 164, such excessive force does not impact the force sensor 170. Specifically, when the pressing element 160 is moved to the second position due to an excessive force applied to the rod 140, the second pressing portion 164 of the pressing element 160 can be separated from the sensing surface 172 of the force sensor 170, thereby preventing the force sensor 170 from being impacted and preventing the internal structure of the force sensor 170 from being damaged.

In other words, when an excessive force is applied to the rod 140, the second pressing portion 164 can be separated from the sensing surface 172 of the force sensor 170 by increasing a distance between the second pressing portion 164 and the stopper 130, thereby preventing the force sensor 170 from being impacted by such excessive force. Specifically, when the pressing element 160 is located at the first position, the second pressing portion 164 of the pressing element 160 and the stopper 130 can be spaced apart by a first distance S1, as shown in FIG. 2C. When the pressing element 160 is located at the second position, the second pressing portion 164 of the pressing element 160 and the stopper 130 can be spaced apart by a second distance S2, as shown in FIG. 3C, in which the first distance S1 is less than the second distance S2.

In addition, the case 102 has a pair of slide slots 107 (for facilitating understanding, the slide slots 107 are labeled in FIG. 1A, FIG. 1B, FIG. 2A, and FIG. 3A), and a portion of either the support arm 166A or the support arm 166B is located in the corresponding slide slot 107 (as shown in FIG. 1A, FIG. 2A and FIG. 3A). An extending length L1 of the portion of the support arm 166A or 166B is less than an extending length L2 of the corresponding slide slot 107, as shown in FIG. 1A. The slide slots 107 may provide position limits for the support arms 166A and 166B, so as to confine the moving distance of the support arm 166A or 166B. For example, when the pressing element 160 is located at the second position, since the portions of the support arms 166A and 166B resist against ends of the slide slots 107, the support arms 166A and 166B moving along the second direction D2 will be stopped by the slide slots 107. Then, when the pressing element 160 at the second position returns to the first position due to the restoring force of the elastic element 180, the second pressing portion 164 of the pressing element 160 will return to a position that is in contact with the sensing surface 172 of the force sensor 170 again. In such a situation, if the second pressing portion 164 of the pressing element 160 moves along the second direction D2 for a too long distance, the compression of the elastic element 180 may increase. Then, if the compression of the elastic element 180 increases, when the second pressing portion 164 of the pressing element 160 returns to the first position from the second position, the action force applied to the sensing surface 172 of the force sensor 170 by the second pressing portion 164 may increase as well and increase a possibility of damaging the internal structure of the force sensor 170. Therefore, with the position limit provided the pressing element 160 by using the slide slots 107, the second pressing portion 164 of the pressing element 160 will prevented from moving for a too long distance, thus preventing the second pressing portion 164 of the pressing element 160 from applying an action force that is greater than an upper limit of force allowed on the sensing surface 172 of the force sensor 170. However, the present disclosure is not limited thereto. In other embodiments, the position limit of the pressing element 160 can be implemented by its own shape or another element (such as the stopper 130).

As described above, the touch stylus 100A can be arranged to make a force applied to the rod 140 become negatively correlated with the pressure applied to the force sensor 170. By such a configuration, the force sensor 170 is prevented from being damaged by an unexpected force. However, the touch stylus of the present disclosure is not limited thereto. In other embodiments, the configuration of the touch stylus may be varied and the mechanism for preventing the force sensor from being damaged as described above is achieved as well.

Figure 4A:
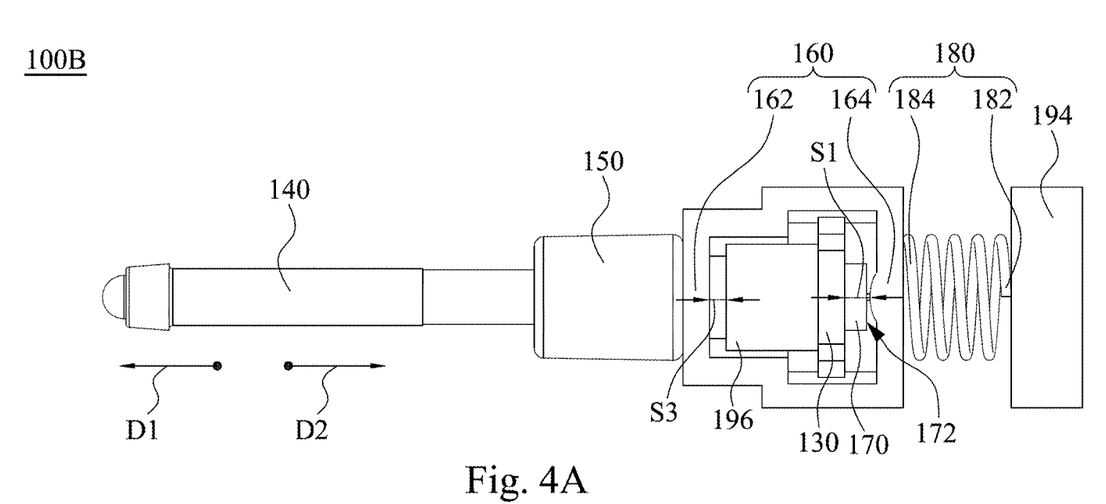
FIGS. 4A and 4B are top views of a stopper, a rod, a pusher, a pressing element, a force sensor, an elastic element, a fixed element, and a position limiter of a touch stylus according to a second embodiment of the present disclosure, in which the pressing element shown in FIG. 4A is located at a first position and the pressing element shown in FIG. 4B is located at a second position.
Figure 4B:
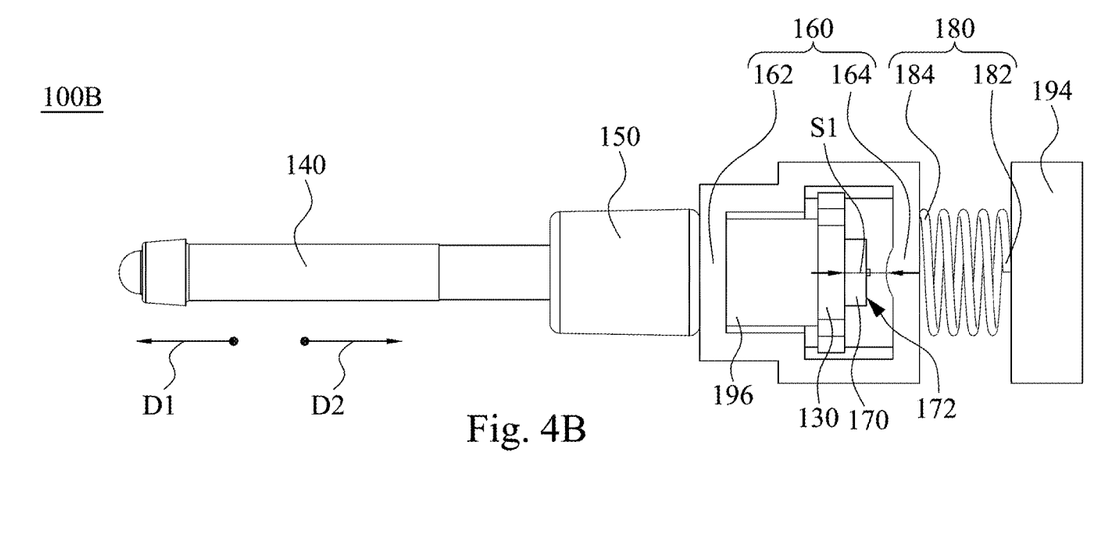

For example, reference is made to FIG. 4A and FIG. 4B. FIGS. 4A and 4B are top views of a stopper 130, a rod 140, a pusher 150, a pressing element 160, a force sensor 170, an elastic element 180, a fixed element 194, and a position limiter 196 of a touch stylus 100B according to a second embodiment of the present disclosure, in which the pressing element 160 shown in FIG. 4A is located at a first position and the pressing element 160 shown in FIG. 4B is located at a second position. For convenience of description, a first direction D1 and a second direction D2 are illustrated in FIG. 4A and FIG. 4B.

At least one difference between the present embodiment and the first embodiment is that the touch stylus 100B of the present embodiment further includes a fixed element 194, and that the elastic element 180 is disposed at a position different from the position of the elastic element 180 of the first embodiment.

The fixed element 194 may be connected to and fixed on the case or the board (e.g. the case 102 or the board 110 illustrated in FIG. 1B), in which the second pressing portion 164 of the pressing element 160 is located between the force sensor 170 and the fixed element 194. Since the fixed element 194 is connected to and fixed on the case or the board, the rod 140, the pusher 150, and the pressing element 160 are moveable relative to the fixed element 194.

The elastic element 180 is disposed between the fixed element 194 and the second pressing portion 164 of the pressing element 160, and is connected to the second pressing portion 164 of the pressing element 160. Similarly, the elastic element 180 may be a spring and has a first end 182 and a second end 184 which are opposite each other. The first end 182 of the elastic element 180 is fixed on the fixed element 194, and the second end 184 of the elastic element 180 abuts against the second pressing portion 164 of the pressing element 160. In addition, the force sensor 170 and the elastic element 180 may be respectively located at two opposite sides of the second pressing portion 164 of the pressing element 160 (e.g. front and back sides of the second pressing portion 164), and separated from each other by the second pressing portion 164 of the pressing element 160, so as to simplify the assembly stage of the touch stylus 100B.

As shown in FIG. 4A, when the pressing element 160 is at the first position, the second pressing portion 164 of the pressing element 160 is in contact with the sensing surface 172 of the force sensor 170. Specifically, with a force applied to the second pressing portion 164 of the pressing element 160 by the elastic element 180, the pressing element 160 can be pushed along the first direction D1, such that the second pressing portion 164 of the pressing element 160 will press the bump of the sensing surface 172 of the force sensor 170. As shown in FIG. 4B, when the pressing element 160 is pushed and moved to the second portion by the rod 140 and the pusher 150, the second pressing portion 164 of the pressing element 160 may escape from the sensing surface 172 of the force sensor 170, so as to be separated from the sensing surface 172 of the force sensor 170. Specifically, when the pressing element 160 is located at the first position, the second pressing portion 164 of the pressing element 160 and the stopper 130 can be spaced apart by a first distance S1, as shown in FIG. 4A. When the pressing element 160 is located at the second position, the second pressing portion 164 of the pressing element 160 and the stopper 130 can be spaced apart by a second distance S2, as shown in FIG. 4B, in which the first distance S1 is less than the second distance S2.

By the above configuration, the touch stylus 100B can be arranged to make a force applied to the rod 140 become negatively correlated with the pressure applied to the force sensor 170 by the second pressing portion 164, thereby preventing the force sensor 170 from being damaged by an unexpected force applied to the touch stylus 100B.

Furthermore, the touch stylus 100G may include a position limiter 196 which is disposed between the first pressing portion 162 of the pressing element 160 and the stopper 130. The position limiter 196 may define a moving distance of the pressing element 160 moving from the first position to the second position. Specifically, when the pressing element 160 is located at the first position, the position limiter 196 and the first pressing portion 162 of the pressing element 160 are separated from each other and spaced apart by a third distance S3. When the pressing element 160 moves to the second position from the first position, since the first pressing portion 162 of the pressing element 160 resists against the position limiter 196, the pressing element 160 moving along the second direction D2 will be stopped by the position limiter 196 and the pressing element 160 is located at the second position. In other words, a moving distance of the pressing element 160 moving from the first position to the second position can be substantially equal to the third distance S3. By defining the moving distance of the pressing element 160 moving from the first position to the second position, the second pressing portion 164 of the pressing element 160 can be prevented from applying an action force that is greater than an upper limit of force allowed on the sensing surface 172 of the force sensor 170 thereto when the second pressing portion 164 of the pressing element 160 moves back to the first position. The position limiter 196 is elastic. For example, the position limiter 196 may be a rubber, a sponge or another elastic material. By the elasticity of the position limiter 196, the first pressing portion 162 of the pressing element 160 and the position limiter 196 can be prevented from being damaged by mutual collisions. Moreover, as the position limiter 196 is elastic, the moving distance of the pressing element 160 moving from the first position to the second position is substantially greater than the third distance S3. The present disclosure is not limited thereto. In other embodiments, the position limit of the pressing element 160 can be achieved by its own shape or another element (e.g. the stopper 130).

To sum up, the touch stylus of the present disclosure includes the stopper, the rod, the pressing element, the force sensor, and the elastic element. The rod and the pressing element are moveable relative to the stopper. The pressing element includes the first pressing portion and the second pressing portion, and the elastic element is connected to the pressing element. The first pressing portion is located between the rod and the stopper, and the stopper is located between the first pressing portion and the second pressing portion. The force sensor is disposed between the stopper and the second pressing portion. By this configuration, when a force applied to the stopper increases, the distance between the second pressing portion and the force sensor corresponding may increase as well. Therefore, when an excessive force is applied to the rod, the force sensor can be prevented from being impacted by the excessive force transmitted from the second pressing portion to the force sensor, and the internal structure of the force sensor can be prevented from being damaged.

It will be apparent to those skilled in the art that various modifications and variations can be made to the structure of the present disclosure without departing from the scope or spirit of the present disclosure. In view of the foregoing, it is intended that the present disclosure cover modifications and variations of the present disclosure provided they fall within the scope of the following claims.

What is claimed is:

1. A touch stylus comprising:
   a stopper;
   a rod moveable relative to the stopper in a direction;
   a pressing element moveable relative to the stopper and comprising a first pressing portion, a second pressing portion, and at least one support arm, wherein the first pressing portion is located between the rod and the stopper, the stopper is located between the first pressing portion and the second pressing portion, and the at least one support arm extends from the first pressing portion to the second pressing portion;
   a force sensor disposed between the stopper and the second pressing portion and having a sensing surface, wherein the sensing surface of the force sensor is perpendicular to the direction in which the rod is moveable; and
   an elastic element connected to the pressing element, wherein the pressing element abuts against the force sensor when the pressing element is located at a first position, and the pressing element and the force sensor are separated from each other when the pressing element is located at a second position.

2. The touch stylus of claim 1, wherein the elastic element is disposed between the first pressing portion and the stopper.

3. The touch stylus of claim 2, wherein the elastic element has a first end and a second end which are opposite each other, the first end is fixed on the stopper, and the second end abuts against the first pressing portion.

4. The touch stylus of claim 2, wherein the force sensor and the elastic element are separated from each other by the stopper.

5. The touch stylus of claim 2, further comprising:
   a case on which the stopper and the pressing element are disposed, wherein the case has a slide slot, a portion of the at least one support arm is located in the slide slot, and an extending length of the portion of the at least one support arm is less than an extending length of the slide slot.

6. The touch stylus of claim 1, further comprising:
   a fixed element, wherein the second pressing portion is located between the force sensor and the fixed element, the elastic element is disposed between the second pressing portion and the fixed element, and the second pressing portion is moveable relative to the fixed element.

7. The touch stylus of claim 6, wherein the elastic element has a first end and a second end which are opposite each other, the first end is fixed on the stopper, and the second end abuts against the second pressing portion.

8. The touch stylus of claim 6, wherein the force sensor and the elastic element are separated from each other by the second pressing portion.

9. The touch stylus of claim 6, further comprising a position limiter which is elastic and is disposed between the first pressing portion and the stopper, wherein the position limiter and the first pressing portion are separated from each other when the pressing element is located at the first position.

10. The touch stylus of claim 1, wherein the second pressing portion and the stopper are spaced apart by a first distance when the pressing element is located at the first position, and the second pressing portion and the stopper are spaced apart by a second distance when the pressing element is located at the second position, wherein the first distance is less than the second distance.

11. The touch stylus of claim 1, wherein the force sensor is fixed on the stopper, and the second pressing portion presses the sensing surface when the pressing element is located at the first position.

12. The touch stylus of claim 1, wherein the at least one support arm is a pair of support arms, the first pressing portion and the second pressing portion are connected to each other by the pair of support arms, and the first pressing portion, the second pressing portion, and the pair of support arms collectively forms a ring-shaped structure.

13. The touch stylus of claim 1, further comprising:
   a case on which the stopper and the pressing element are disposed, wherein the rod extends from inside the case to outside the case; and
   a pusher disposed between the rod and the pressing element, wherein the case has an abutting surface facing the pusher, and the pusher abuts against the abutting surface when the pressing elements is located at the first position.

14. A touch stylus comprising:
   a rod moveable in a direction;
   a force sensor having a sensing surface which faces away from the rod, wherein the sensing surface of the force sensor is perpendicular to the direction in which the rod is moveable; and
   a pressing element comprising a first pressing portion, a second pressing portion, and at least one support arm which connects the first pressing portion to the second pressing portion, wherein the first pressing portion is located between the rod and the force sensor, the force sensor is located between the first pressing portion and the second pressing portion, and the sensing surface faces toward the second pressing portion.

15. The touch stylus of claim 14, further comprising:
   a stopper disposed between the first pressing portion and the force sensor; and
   an elastic element disposed between the first pressing portion and the stopper.

16. The touch stylus of claim 14, further comprising:
   a stopper disposed between the first pressing portion and the force sensor;
   a fixed element, wherein the second pressing portion is located between the force sensor and the fixed element; and
   an elastic element disposed between the second pressing portion and the fixed element.

* * * * *